US008315412B2

(12) United States Patent
Strait et al.

(10) Patent No.: US 8,315,412 B2
(45) Date of Patent: Nov. 20, 2012

(54) METHOD AND APPARATUS TO FACILITATE USE OF BACKGROUND NOISE WHEN PROVIDING SECURE ACCESS TO EQUIPMENT

(75) Inventors: Larry Strait, Glen Ellyn, IL (US); Steve Coates, Bensenville, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 1114 days.

(21) Appl. No.: 11/873,555

(22) Filed: Oct. 17, 2007

(65) Prior Publication Data

US 2009/0103739 A1     Apr. 23, 2009

(51) Int. Cl.
*H03G 3/20*     (2006.01)
(52) U.S. Cl. ........... 381/110; 381/56; 704/233; 704/273
(58) Field of Classification Search ............... 381/56–58, 381/104–110, 86, 71.1–71.14, 94.1–94.9; 704/231, 233, 225–226, 270–275, 246; 340/506
See application file for complete search history.

(56) References Cited

U.S. PATENT DOCUMENTS

| | | | |
|---|---|---|---|
| 5,668,929 A * | 9/1997 | Foster, Jr. ................. 704/273 |
| 5,805,672 A * | 9/1998 | Barkat et al. ............. 379/88.03 |
| 6,167,118 A * | 12/2000 | Slivensky ................. 379/88.03 |
| 6,654,721 B2 * | 11/2003 | Handelman ................... 704/270 |
| 6,952,155 B2 * | 10/2005 | Himmelstein ............... 340/5.52 |
| 7,194,412 B2 * | 3/2007 | Mays ........................... 704/275 |
| 7,747,446 B2 * | 6/2010 | Blass et al. ................... 704/275 |
| 7,826,945 B2 * | 11/2010 | Zhang et al. .................. 701/36 |
| 7,904,300 B2 * | 3/2011 | Abbott et al. ................ 704/275 |
| 2004/0220798 A1 * | 11/2004 | Chi et al. ..................... 704/201 |
| 2008/0140400 A1 * | 6/2008 | Blass et al. ................... 704/246 |

* cited by examiner

*Primary Examiner* — Vivian Chin
*Assistant Examiner* — Fatimat O Olaniran
(74) *Attorney, Agent, or Firm* — Fitch Even Tabin & Flannery LLP (57) ABSTRACT

A user interface device provides secure access to equipment. An audio reception device is adapted to receive an audio input comprising background noise and to receive an audio user code from a user. A user input device receives a manual input comprising a manual user code from the user. A control unit stores one or more target user codes and receives an audio input and determines a noise level of the background noise. An instruction message is generated to inform the user to enter the manual user code in response to the noise level of the background noise exceeding a predetermined threshold level. An output device provides the instruction message to the user. A control unit provides secure access to the equipment in response to at least one of the audio user code and the manual user code.

16 Claims, 4 Drawing Sheets

METHOD AND APPARATUS TO FACILITATE USE OF BACKGROUND NOISE WHEN PROVIDING SECURE ACCESS TO EQUIPMENT

TECHNICAL FIELD

This invention relates generally to voice-based security techniques.

BACKGROUND

There are many different types of electronic and/or mechanical devices for which access is protected by entry of a code or password (such as a series of alphabetic, numeric, or alphanumeric characters). To gain access to the electronic and/or mechanical device, a user may be required to enter the code or password. In the event that the correct code is submitted via a user interface, the user is granted access to the electronic and/or mechanical device.

There are different ways in which the user can submit codes. For example, the user may type out the code on a keyboard or keypad. In the event that the user is required to type in the code to gain secure access to a security gate or garage door, the requirement of having to type in the code can sometimes be problematic for the user. For example, if the user is holding packages in both hands, the user would have to set at least one of the packages down to free a hand with which to type the code. Moreover, in the event that the keypad has small keys, some users might have to take off gloves when typing the code in on a cold winter evening, resulting in inconvenience or worse.

Other systems utilize voice recognition. The user may speak the code and voice recognition software detects a spoken code and compares the spoken code with a code pre-stored in a memory. A problem arises, however, in the event that the background noise level is relatively high. For example, if located near a busy traffic intersection it may be difficult to detect the spoken words and determine the code. It may also occasionally be difficult for the voice recognition program to determine a spoken code on a windy day when the wind is blowing toward a microphone used with the voice recognition device. Accordingly, in the event of such conditions where the background noise level is relatively high, it can be difficult for typical voice recognition devices to accurately detect a spoken code. Therefore, some current systems may not provide secure access to a security gate or garage door to the user speaking a correct code when the background noise level is too large.

SUMMARY OF THE INVENTION

An embodiment of the present invention is directed to a method for providing secure access to equipment such as a movable barrier operator for controlling movement of a movable barrier, such as a garage door. An audio input comprising background noise is received. A noise level of the background noise is determined and the user is instructed to manually enter a manual user code with a user input device in response to the background noise level exceeding a predetermined threshold level. Secure access to the equipment is provided in response the manual user code entered by the user matching a predetermined code.

An embodiment of the invention is directed to a user interface device for providing secure access to equipment. An audio reception device is adapted to receive an audio input comprising background noise. A user input device receives a manual input comprising a manual user code from a user. A control unit stores one or more target user codes and determines a noise level of the background noise. An instruction message is generated to inform the user to enter the manual user code in response to the noise level of the background noise exceeding a predetermined threshold level. An output device provides the instruction message to the user. A control unit provides secure access to the equipment in response to the manual user code matching one of the target codes.

An embodiment of the invention is directed to a system for providing secure access to a movable barrier. A barrier movement operator controls the movable barrier to perform movable barrier functions. A user interface device receives an audio input comprising background noise. The user interface device determines a noise level of the background noise and instructs a user to manually enter a manual user code with a user input device in response to the noise level exceeding a predetermined threshold level. The user interface device also provides secure access to the barrier movement operator in response to the manual user code matching the at least one predetermined target code.

A user interface device provides secure access to the barrier movement operator in response to at least one of: (a) receiving an audio input comprising an audio user code and background noise, wherein the audio user code matches at least one predetermined target code and a background noise level of background noise is below a predetermined threshold noise level, and (b) receiving a manual user code the matches the at least one predetermined target code via a manual input. A user is instructed to manually enter a manual user code with a user input device in response to the background noise level exceeding the predetermined threshold level.

An embodiment of the invention is directed to a method of programming a user interface device with a target audio code to provide secure access to equipment in response to receiving an audio input comprising an audio user code matching the target audio code and a background noise level being below a predetermined threshold noise level. A learning mode is initiated in response to a user input. The target audio code is received from a user. A background noise level is determined, and the target audio code is stored in a memory in response to the background noise level being below the predetermined threshold level. Of course, the background noise level can be determined either prior to or after the target audio code is received from the user as long as it is within a short time of receiving the target audio code.

According to various embodiments, a user interface device with voice recognition capabilities is provided that permits a user to enter an audio user code or password via spoken words or a user input device to gain secure access to certain equipment, such as a movable barrier operator for controlling a movable barrier such as a garage door or access gate. The user has the option of either directly speaking the audio user code or typing it in via the user input device such as a keypad. The speaker's voice is detected and sound is converted into an electrical signal that is provided to a processor. The background noise level is measured either during the receiving of the user code or within a short period before or after receiving the user code and compared against a predetermined threshold. In the event that the background noise level exceeds the predetermined threshold level, the user is instructed to manually enter a manual user code via the user input device. If, however, the background noise level does not exceed the predetermined threshold, the audio user input is processed to determine whether an audio user code was spoken that matches a target or predetermined code. In the event that the user manually enters a matching code or speaks a matching audio user code when the background noise level is below the predetermined threshold level, the user will be granted access to the electronic device.

Under typical operating conditions, the processor determines the spoken audio user code and compares the spoken audio user code with a pre-determined code. If the spoken audio user code matches the pre-determined code, the user is granted access to an electronic device, such as a movable barrier operator for opening or closing a movable barrier, such as a gate or a garage door. If, on the other hand, the user's spoken audio user code does not match the pre-determined code, the user will not be granted access to the electronic device. If the user's audio user code does not match the stored code, the user can be prompted to enter the code again according to some embodiments.

The above summary of the present invention is not intended to represent each embodiment or every aspect of the present invention. The detailed description and figures will describe many of the embodiments and aspects of the present invention.

BRIEF DESCRIPTION OF THE DRAWINGS

The above needs are at least partially met through provision of the method and apparatus for remote control described in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, a user interface device with voice recognition capabilities is provided that permits a user to enter an audio user code or password via spoken words or enter a manual user code via a user input device such as a keypad to gain secure access to certain equipment. The equipment may include a movable barrier operator for controlling a movable barrier such as a garage door or access gate. Under normal conditions, the user has the option of either directly speaking the audio user code or manually entering the manual user code via the user input device. The user may, for example, walk up (or drive up) to the user interface and speak the audio user code. The user interface includes a microphone or another type of audio reception device and has voice recognition capabilities. The microphone detects audible sound and converts the sound from the user into an electrical signal that is provided to a processor. Under typical operating conditions, the processor determines the spoken audio user code and compares the spoken audio user code with a pre-determined audio user code. If the spoken audio user code matches the pre-determined audio user code, the user is granted access to the equipment, such as a movable barrier operator for opening or closing a movable barrier, such as a gate or a garage door. If, on the other hand, the user's spoken audio user code does not match the pre-determined audio user code, the user will not be granted access to the equipment. If the user's audio user code does not match the stored audio user code, the user is prompted to enter the audio user code again according to some embodiments.

According to some embodiments of the invention, the user interface device includes a motion detector. Upon sensing the presence of a person, the microphone is enabled to receive audio from the user. In some embodiments, the microphone is always on and continually provides electrical signals based on received audio to the processor. According to other embodiments, the user may press a button to enable the microphone and then speak the code.

There are some situations in which the user will not be allowed to provide a spoken audio user code and will instead be required to manually submit a manual user code via the keypad. In some embodiments, the audio user code and the manual user code are identical. In other embodiments, they are different. The user may be required to submit the manual user code if the background noise level is too high such that it is not possible to accurately determine a spoken audio user code or if the microphone is faulty or malfunctions. In the event that the background noise level exceeds a predetermined threshold noise level, the user is prompted to manually enter the manual user code via the keypad. In some embodiments, this prompt is audible, i.e., the user interface device plays a prerecorded audio file that informs the user to manually provide the manual user code. In other embodiments, the prompt is visual such that a message is displayed instructing the user to manually enter the manual user code.

Accordingly, the user interface device described herein provides significant advantages over existing code protection systems in that it allows a user to either audibly speak the audio user code or manually enter the manual user code via the user input device. The user interface device provides enhanced reliability by instructing the user to manually enter the manual user code via the user input device when the background noise level exceeds the predetermined threshold level.

Figure 1:
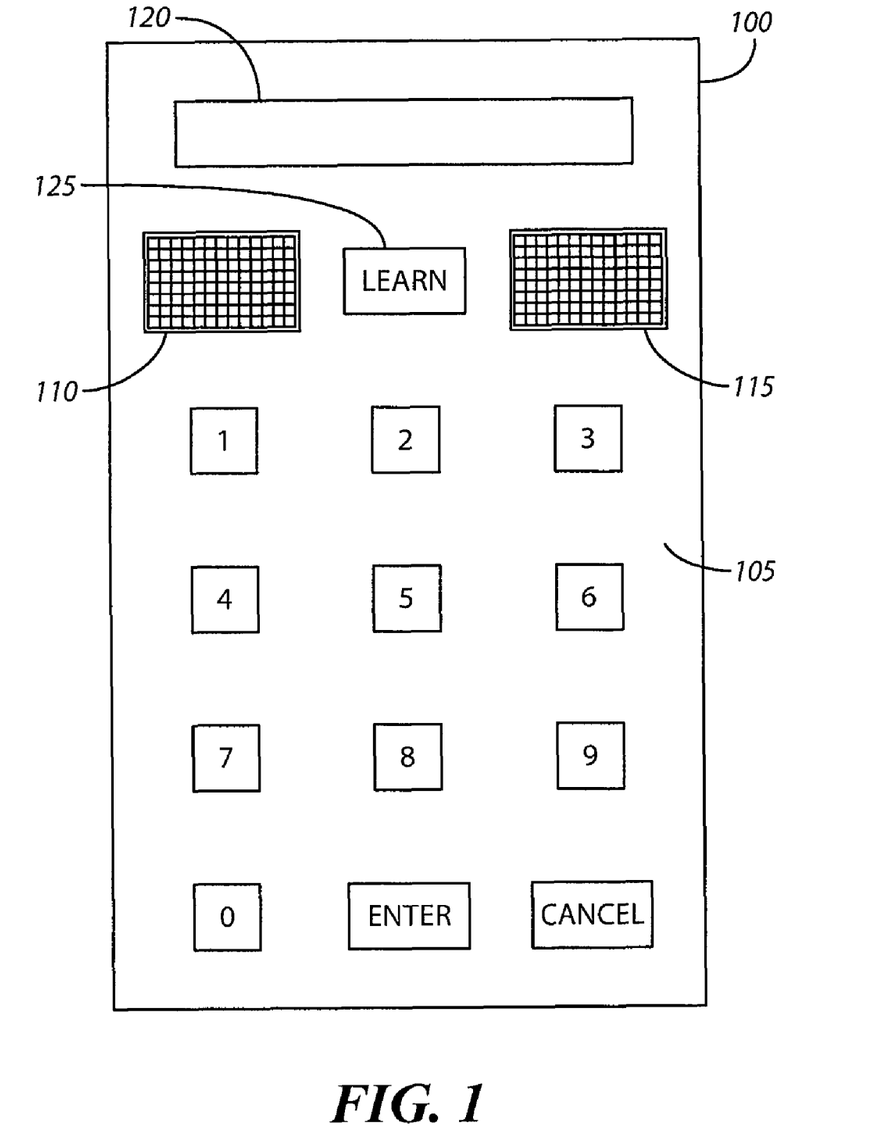
FIG. 1 illustrates a user interface device according to at least one embodiment of the invention.

FIG. 1 illustrates a user interface device 100 according to at least one embodiment of the invention. The user interface device 100 is in communication with certain equipment such as, for example, a movable barrier operator for moving a barrier such as a garage door or gate, as discussed below with respect to FIG. 3. In the event that the equipment includes a movable barrier operator, the user interface device 100 controls access to the movable barrier operator. In order to gain secure access to the movable barrier operator, the user must provide an audio user code or a manual user code that matches a predetermined code stored in a memory within or accessible by the user interface device 100. It should be appreciated that in some embodiments of the invention, the requirement of entering an audio user code or a manual user code may be overridden or set such that the code is not required at certain times.

Under normal operating conditions, the user may either speak an audio user code or manually enter a manual user code via a keypad 105 of the user interface device 100. Although only a keypad 105 is shown, it should be appreciated that a different type of user input device may alternatively be utilized, such as roller switches. In some embodiments, the audio user code and the manual user code may be identical. In other embodiments, they may be different codes. It may be easier or more desirable for the user to speak the audio user code instead of entering the manual user code such as, for example, when holding groceries or other items with both of the user's hands. Accordingly, in such instances, the user can approach the user interface device 100 and speak the audio user code. Audio from the user is detected by a microphone 110 and converted into an electrical signal. A background noise level is determined and compared against a predetermined threshold background noise level by a processor. In the event that the background noise level is above the threshold, the processor instructs the user to manually enter the code via the keypad 105 because the background noise level is too high to accurately determine the audio user code.

On the other hand, if the background noise level is below the predetermined threshold, the processor determines whether the audio user code or other words spoken by the user match a pre-determined code. In the event of a match, the user is granted secure access to the movable barrier and can then assert a button or audibly instruct the movable barrier operator to move the movable barrier or perform some other movable barrier function such as turning on a light associated with the movable barrier. Alternatively, the user interface device 100 automatically sends a control signal to the movable barrier operator to move the movable barrier when a matching audio user code is detected. In some embodiments, the user interface device 100 stores multiple codes, and each of the codes is associated with different functions or access rights. For example, upon entering a first audio user code or manual user code, the user may be granted access to certain functions of the movable barrier operator, such as opening or closing the movable barrier. Upon entering a different audio user code or manual user code, on the other hand, the user may be granted access to other functions such as a timer for a light within a garage to which access is restricted by the movable barrier.

In the event that the background noise level exceeds the threshold noise level, the user is notified that the keypad or other user input device must be used to manually provide the manual user code. The notification may be an audible notification provided via a speaker 115. For example, the speaker 115 may play a sound file pre-stored in a memory of the user interface device 100 that says, "Please manually enter the code with the keypad." Alternatively, or additionally, a display screen 120, such as a Liquid Crystal Display ("LCD") screen may visually display the same message to indicate that the keypad 105 should be used to manually enter the manual user code.

The user interface device 100 shown in FIG. 1 includes a numeric keypad. However, it should be appreciated that an alphanumeric keypad, roller switches, or any other type of user input device for accepting inputs from a user could alternatively be used.

The user interface device 100 may also include a learn button 125 or programming button. The learn button 125 may be asserted to allow the user to program an audio user code or a manual user code into the memory such that the user may subsequently speak this audio user code or enter the manual user code in order to gain access to the movable barrier operator. In some embodiments, the learn button 125 is located on the bottom or back of the user interface device 100, instead of on the face. A flow diagram of the learning process is described below with respect to FIG. 5.

Figure 2:
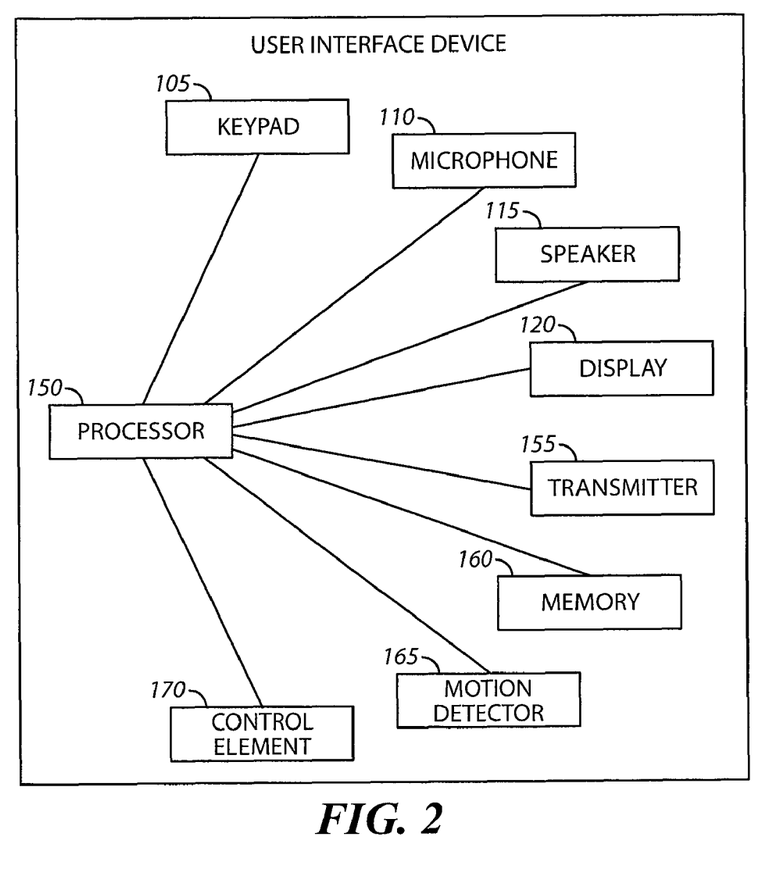
FIG. 2 illustrates the internal components of the user interface device according to at least one embodiment of the invention.

FIG. 2 illustrates internal components of the user interface device 100 according to at least one embodiment of the invention. As shown, the user interface device 100 includes the keypad 105, microphone 110, speaker 115, and display 120. The user interface device 100 also includes a processor 150, transmitter 155, memory 160, and a control element 170. The user interface device 100 may further include a motion detector 165 in some embodiments. The processor 150 is in communication with all of the internal components of the user interface device 100.

As discussed above with respect to FIG. 1, the user may speak the audio user code while in relatively close proximity to the user interface device 100, and the microphone 110 converts the received audio into an electrical signal that is subsequently processed by the processor 150. The memory 160 is utilized to stored program code which be executed by the processor 150 to implement a voice recognition application. The memory 160 may also store a predetermined maximum threshold noise level.

According to some embodiments of the invention, the user interface device 100 includes a motion detector 165. Upon detecting the presence of a person via this motion detector 165, the microphone 110 is enabled to receive audio from the user. (Other mechanisms, such as infrared detectors, may serve as user detectors as well if desired as will be well understood by those skilled in the art.) In some embodiments, the microphone 110 is always on and continually provides electrical signals based on received audio to the processor 150. According to other embodiments, the user may assert a button to enable the microphone 110 and then speak the audio user code.

The control element 170 provides access to the movable barrier operator or other equipment when the user provides an audio user code or a manual user code that matches a predetermined code stored in the memory 110. For example, upon determining that the audio user code provided by the user matches a predetermined code, the processor 150 instructs the control element 170 to provide secure access to the movable barrier operator. It should be appreciated, however, that in some embodiments the processor 150 itself provides access to the electronic device instead of a separate control element 170.

In general, the larger the amount of background noise, the more difficult it is to determine the identity of a spoken audio user code. The predetermined threshold is utilized to prevent the user from being granted access to the movable barrier operator or other equipment when the background noise level is too large for the voice recognition to operate reliably. In the event that the background noise level is above the predetermined threshold level, the message is played to the user via the speaker 115 to inform the user to use the keypad 105 to manually enter the manual user code. The message may be stored as an audio file within the memory 160. As discussed above, the user interface device 100 may also display a visual message on the display 120 to indicate that the user is to manually enter the manual user code. In embodiments where the microphone 110 is always powered to detect audio, it may be desirable to visually indicate to the user that the code should be manually entered instead of repeatedly replaying the audio file that could be bothersome to people within neighboring residences or the like.

Figure 3:
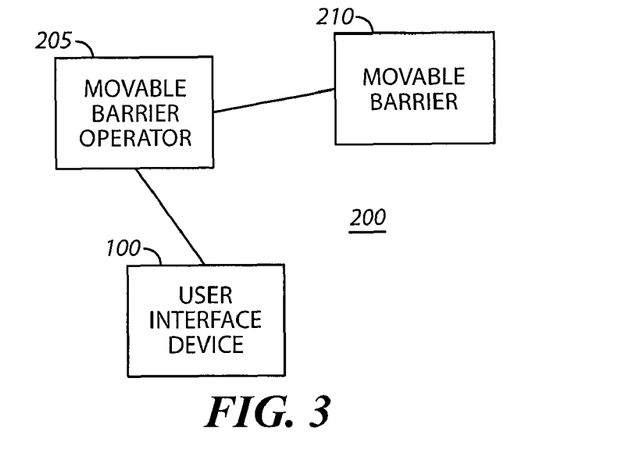
FIG. 3 illustrates a system according to at least one embodiment of the invention.

FIG. 3 illustrates a system 200 according to at least one embodiment of the invention. As shown, the system 200 includes the user interface device 100, a movable barrier operator 205, and a movable barrier 210. The combination of the movable barrier 210 and the movable barrier operator 205 may be similar to, or the same as, the movable barrier and movable barrier operator discussed in U.S. Pat. No. 6,737, 968, the disclosure of which is incorporated by reference in its entirety.

Accordingly, the user may approach the user interface device 100 and speak the audio user code to gain access to the movable barrier operator. As discussed above, in the event that the background noise level exceeds a predetermined threshold level, the user will be prompted to manually enter the manual user code via a user input device. Upon providing the correct user code, a signal is sent to the movable barrier operator to enable its operation such that the user can instruct the movable barrier operator 205 to open or close the movable barrier or perform some other movable barrier functions.

Figure 4:
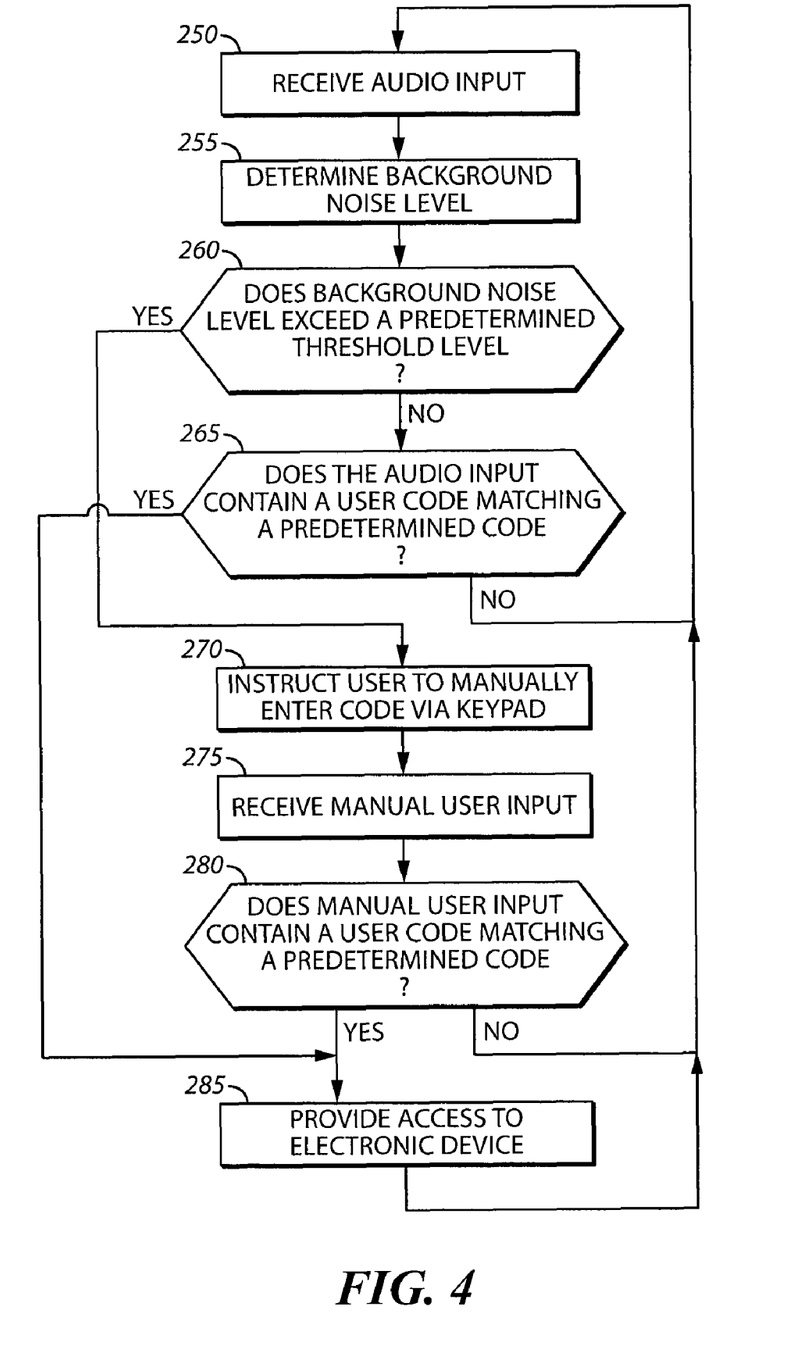
FIG. 4 illustrates a method of providing access to equipment in response to receiving an audio user code or a manual user code that matches a predetermined code according to at least one embodiment of the invention.

FIG. 4 illustrates a method of providing access to equipment in response to receiving an audio user code or a manual user code that matches a predetermined code according to at least one embodiment of the invention. First, an audio input is received from the user at operation 250. As discussed above, the user may walk up to the user interface device and speak the audio user code. Next, at operation 255, the background noise level is determined. At operation 260 an additional determination is made regarding whether the background noise level exceeds a predetermined threshold level. If "yes," processing proceeds to operation 270. If "no," on the other hand, processing proceeds to operation 265 where a determination is made regarding whether the audio input contains an audio user code matching a predetermined code stored in memory. If "yes," processing proceeds to operation 285. If "no," on the other hand, processing returns to operation 250.

At operation 270 the user is instructed to manually enter the manual user code via the keypad 105. Next, the manual user input is received at operation 275. At operation 280 the processor determines whether the manual user input contains a manual user code matching a predetermined code stored in the memory. If "yes," processing proceeds to operation 285 where the user interface device 100 provides access to the electronic device and then processing returns to operation 250. If "no" at operation 280, on the other hand, processing returns to operation 250.

Figure 5:
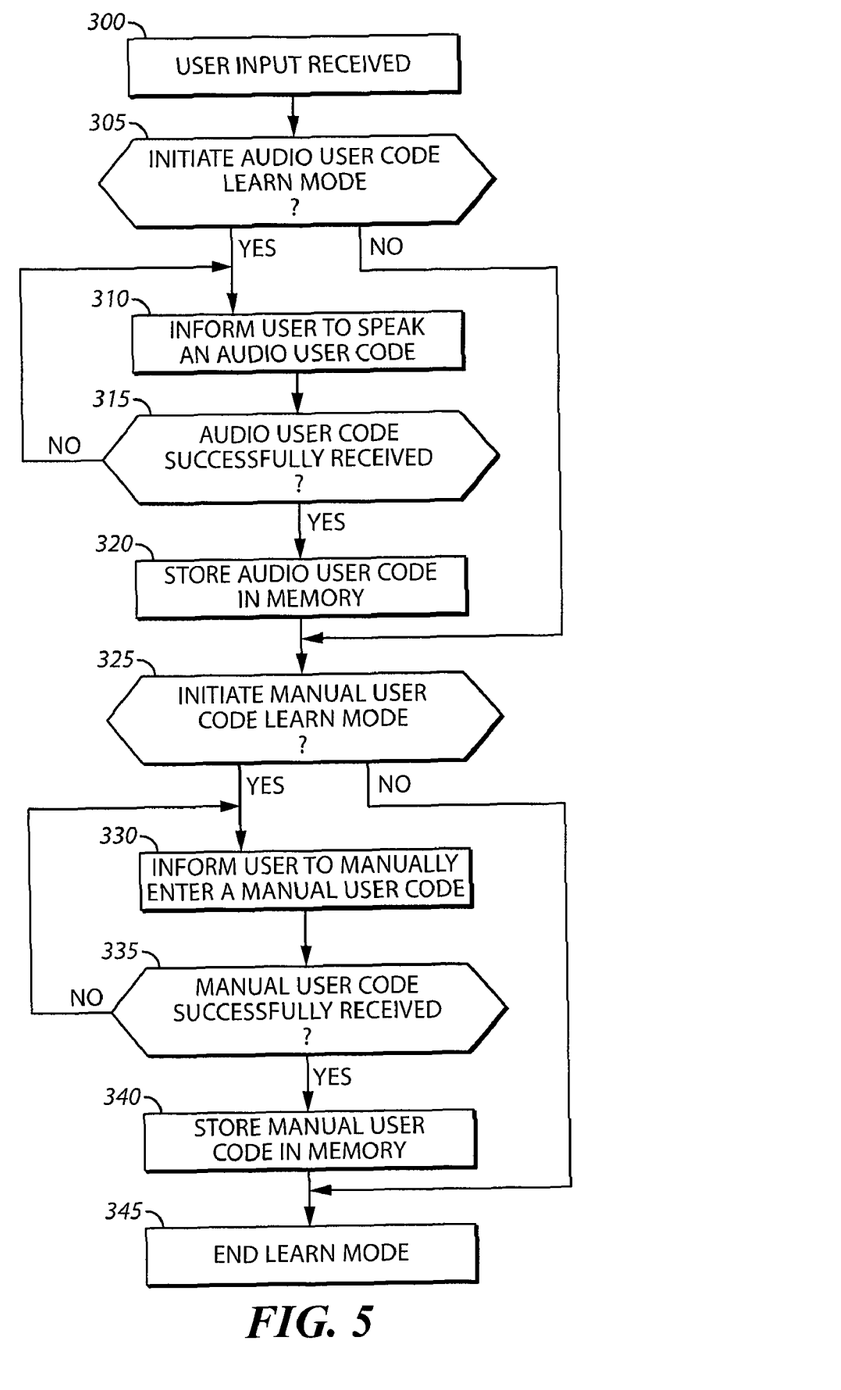
FIG. 5 illustrates a method of learning a user code according to at least one embodiment of the invention.

FIG. 5 illustrates a method of learning a user code according to at least one embodiment of the invention. This method may be initiated in response to the user pressing the learn button 125 on the user interface device 100 shown in FIG. 1. In some embodiments, the user can press the learn button 125 once to initiate a learn mode to learn an audio user code, and rapidly press the learn button 125 twice to initiate another learn mode to learn a manual user code. In other embodiments, the user interface device 100 may include separate buttons for learning an audio user code and a manual user code, respectively. As discussed above with respect to FIG. 1, it should be appreciated that elements other than a learn button 125 may be utilized to initiate a learn mode. For example, in other embodiments, the user may insert a key into a designated keyhole or press a button on the bottom or back of the user interface device 100 to initiate the learn process.

Referring back to FIG. 5, the learn mode is initiated at operation 300 when a user input is received such as, for example, when the learn button 125 is pressed. Next, at operation 305, the processor 150 of the user interface 100 determines whether the audio user code learn mode should be initiated to learn an audio user code. As discussed above, this learn process may be initiated by the user pressing the learn button 125 a single time. If "yes" at operation 305, processing proceeds to operation 310. If "no," on the other hand, processing proceeds to operation 330. At operation 310, the user interface device 100 informs the user to speak the audio user code. The user interface device 100 may inform the user via the display 120 or via an audio message played via the speaker 115.

At operation 315, a determination is made regarding whether the audio user code was successfully received. If "yes," processing proceeds to operation 320 and the audio user code is stored in the memory 160 of the user interface device 100. If "no," on the other hand, processing returns to operation 310 at which point the user is again informed to speak the audio user code. In some embodiments, an error message may be displayed to the user when the background noise level is too high to discern a spoken audio user code and the audio code learn process ends.

At operation 325, a determination is made by the processor 150 as to whether the manual user code learn mode has been initiated to learn a manual user code. As discussed above, the manual user code learn mode may be initiated, for example, by the user quickly pressing the learn button 125 twice in a row. If "yes," processing proceeds to operation 330 where the user is informed to manually enter a manual user code. If "no," on the other hand, processing proceeds to operation 345 where the learn mode is ended. At operation 335, a determination is made as to whether the manual user code has been successfully received. If "yes," processing proceeds to operation 340 where the manual user code is stored in the memory 160 of the user interface device 100. If "no," on the other hand, processing returns to operation 330 at which point the user is again informed to manually enter a manual user code. Finally, after the manual user code is stored in the memory 160 at operation 340, the learn mode ends at operation 345. The learn mode may also include an additional operation to measure the background noise level and use the background noise level as a reference noise-level.

The various embodiments described herein are related to a user interface device for providing access to certain equipment, such as a movable barrier operator for controlling a movable barrier, such as a garage door or access gate. However, it should be appreciated that these teachings are equally applicable to other embodiments for controlling access to an electronic device. For example, these teachings could be applied to control access to a computer or television that is controlled by a code or password.

These teachings provide an access control system and method that provides a user with access to the equipment upon receiving a spoken audio user code or a manually entered manual user code. The system provides enhances functionality and reliability over existing systems because it allows the user to always manually provide the manual user code via a user input device such as a keypad, or to speak the audio user code when the background noise level is below a predetermined threshold. In the event that the background noise level exceeds the predetermined background noise threshold, the user is instructed to manually provide the manual user code via the user input device. By so informing the user, the user experience is improved because the user will not inadvertently speak the code when the background noise level is too high for the voice recognition features to reliability perform such voice recognition.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method for providing access to a secured area the access to which is secured by a barrier, the method comprising:
   activating an audio reception device in response to a detection of a user's presence with a motion detector configured to detect a user's presence;
   receiving an audio input comprising background noise after activation of the audio reception device;
   determining a noise level of the background noise from the audio input;
   instructing the user to manually enter a manual user code to effect access to the secured area with a user input device after the determination of the background noise level and in response to the noise level exceeding a predetermined threshold level;
   receiving by voice command an audio user code at the audio reception device after the determination of the background noise level and if the background noise level does not exceed a predetermined level to open the barrier and provide access to the secured area; and
   effecting with a processor a transmission of a control signal to open the barrier upon receipt of and in response to the manual user code entered by the user matching a predetermined code.

2. The method of claim 1, wherein the receiving comprises receiving an audio input comprising background noise and an audio user code, and the effecting the transmission comprises providing secure access to the secured area in response to the noise level not exceeding the predetermined threshold level and in response to the audio user code matching a predetermined code.

3. The method of claim 1, wherein the instructing is performed audibly via a speaker.

4. The method of claim 1, wherein the instructing is performed visually via a display that displays an instruction message.

5. The method of claim 1, wherein the secured area includes a movable barrier operator in communication with a the barrier and wherein the control signal instructs the movable barrier operator to perform at least one movable barrier function.

6. A user interface device for providing access to a secured area, the user interface comprising:
   an audio reception device configured to receive an audio input comprising background noise and a voice command to effect entry into the secured area;
   a motion detector configured to detect a user's presence and to send a signal to effect activation of the audio reception device in response to a detection of the user's presence in an area proximate to the audio reception device;
   a user input device configured to receive a manual input comprising a manual user code from a user to effect entry into the secured area;
   an output device configured to provide an instruction message to the user to enter the manual user code; and
   a control unit configured to effect storing of one or more target user codes, to receive the audio input, and determine a noise level of the background noise, wherein in response to the noise level of the background noise exceeding a predetermined threshold level, the control unit being configured to generate the instruction message to inform the user to enter the manual user code;
   the control unit configured to automatically send a control signal to provide secure access to the equipment in response to the manual user code matching the one or more target user codes and the control unit further configured to effect a signal after the determination of the background noise level where the signal is effected by the voice command or an audio user code received at the audio reception device to effect entry into the secured area if the background noise does not exceed a predetermined level.

7. The user interface device of claim 6, wherein the audio input further comprises an audio user code, and the control unit is further configured to automatically send the control signal to provide secure access to the equipment in response to the audio user code matching the one or more target user codes.

8. The user interface device of claim 6, wherein the output device comprises a display configured to visually display the instruction message.

9. The user interface device of claim 6, wherein the output device comprises a speaker configured to audibly render the instruction message.

10. The user interface device of claim 6, further comprising a memory configured to store the one or more target user codes.

11. The user interface device of claim 6, wherein the equipment comprises a movable barrier operator in communication with a movable barrier and the control unit is configured to automatically send a control signal to instruct the movable barrier operator to perform at least one movable barrier function.

12. The user interface device of claim 6, wherein the user input device comprises at least one of a keypad, at least one button, and at least one rolling switch.

13. A system for providing access to a secured area and to effect opening and closing a movable barrier, the system comprising:
   a barrier movement operator configured to control the movable barrier to perform movable barrier functions;
   an audio reception device outside the secured area, the audio reception device configured to receive an audio input;
   a motion detector configured to detect a user's presence outside the secured area and in an area proximate to the audio reception device and to activate the audio reception device in response to sensing the user's presence outside the secured area and in the area proximate to the audio reception device;
   a user input device configured to receive a manual user code;
   a control unit configured to determine a noise level of the background noise from the audio input and to instruct a user to manually enter the manual user code with the user input device in response to the noise level exceeding a predetermined threshold level, and the control unit configured to automatically send a control signal to the barrier movement operator in response to the manual user code entered by the user matching a predetermined code and the control unit further configured to effect a signal after the determination of the background noise level where the signal is effected by a voice command or audio user code received at the audio reception device to effect entry into the secured area if the background noise does not exceed a predetermined level.

14. The system of claim 13, further comprising a user interface device comprising a display configured to visually display an instruction message to instruct the user to enter the manual user code via the user input device.

15. The system of claim 14, wherein the user interface device further comprises a speaker configured to audibly render an instruction message to instruct the user to enter the manual user code via the user input device.

16. The method of claim 2 wherein the manual user code and the audio user code are identical.

* * * * *

UNITED STATES PATENT AND TRADEMARK OFFICE
CERTIFICATE OF CORRECTION

PATENT NO. : 8,315,412 B2
APPLICATION NO. : 11/873555
DATED : November 20, 2012
INVENTOR(S) : Larry Strait and Steve Coates Page 1 of 1

It is certified that error appears in the above-identified patent and that said Letters Patent is hereby corrected as shown below:

IN THE CLAIMS:

Column 9, Claim 5, Lines 39-40; Change "with a the" to -- with the --.

Signed and Sealed this
Second Day of April, 2013

Teresa Stanek Rea
*Acting Director of the United States Patent and Trademark Office*